United States Patent [19]
Breeding

[11] 3,796,925
[45] Mar. 12, 1974

[54] AC SOLENOID CONTROL CIRCUIT

[75] Inventor: William C. Breeding, Arleta, Calif.

[73] Assignee: Richard Hearn, Santa Barbara, Calif.

[22] Filed: Aug. 17, 1972

[21] Appl. No.: 281,474

[52] U.S. Cl. ............. 317/157, 134/57 D, 134/58 D, 137/93, 200/61.05, 307/252 T, 317/DIG. 3
[51] Int. Cl. ........................................... H01h 47/32
[58] Field of Search ............... 307/116, 118, 252 T; 222/56, 57; 137/88, 93, 268, 392; 324/65 R, 65 P; 134/57 D, 58 D, 93; 200/61.05; 317/DIG. 3, 148.5 B, 157

[56] References Cited
UNITED STATES PATENTS

| | | | |
|---|---|---|---|
| 3,680,070 | 7/1922 | Nystuen | 137/88 |
| 3,242,473 | 3/1966 | Shivers, Jr. et al. | 324/65 P |
| 3,014,178 | 12/1961 | Dunn | 317/DIG. 3 |

*Primary Examiner*—J. D. Miller
*Assistant Examiner*—Harry E. Moose, Jr.
*Attorney, Agent, or Firm*—Spensley, Horn & Lubitz

[57] ABSTRACT

A solid state low power circuit for controlling an AC solenoid, comprising a power section and a control section. The control section provides a means which responds to the conductivity of a fluid, preferably a low impedance probe, and a means for switching AC power to a solenoid when the conductivity falls below a predetermined level. Typically, the present invention is used to control the concentration of a particular material in a fluid such as, for example, the concentration of a detergent in the water bath of a commercial dishwashing apparatus. The invented circuit monitors the concentration of the material in the fluid and activates an AC solenoid when additional material is required. The solenoid, when activated, causes the controlled material to be dispensed into the fluid. The power section is adapted to receive AC power from a conventional source; it provides low AC power to the control section. A preferred embodiment of the power section has an automatic turn-on capability provided by the use of the low impedance probe which detects the presence of the fluid (typically water) in the vicinity of its supply source. The present invention is adapted to operate with an electronic alarm and an electronic monitor section. The alarm section provides an audio and visual indication when the conductivity of the fluid, i.e., the concentration of the controlled material, reaches a predetermined alarm level. The monitor section provides a meter which, when properly calibrated, indicates the conductivity of the fluid and, therefore, the concentration of the controlled material therein. The present invention is characterized by a high degree of sensitivity to changes in the concentration of the controlled material, very sharp turn-on and turn-off of the solenoid without bounce, great accuracy or resolution of control, and relative insensitivity to temperature changes of the fluid.

6 Claims, 3 Drawing Figures

POWER SECTION

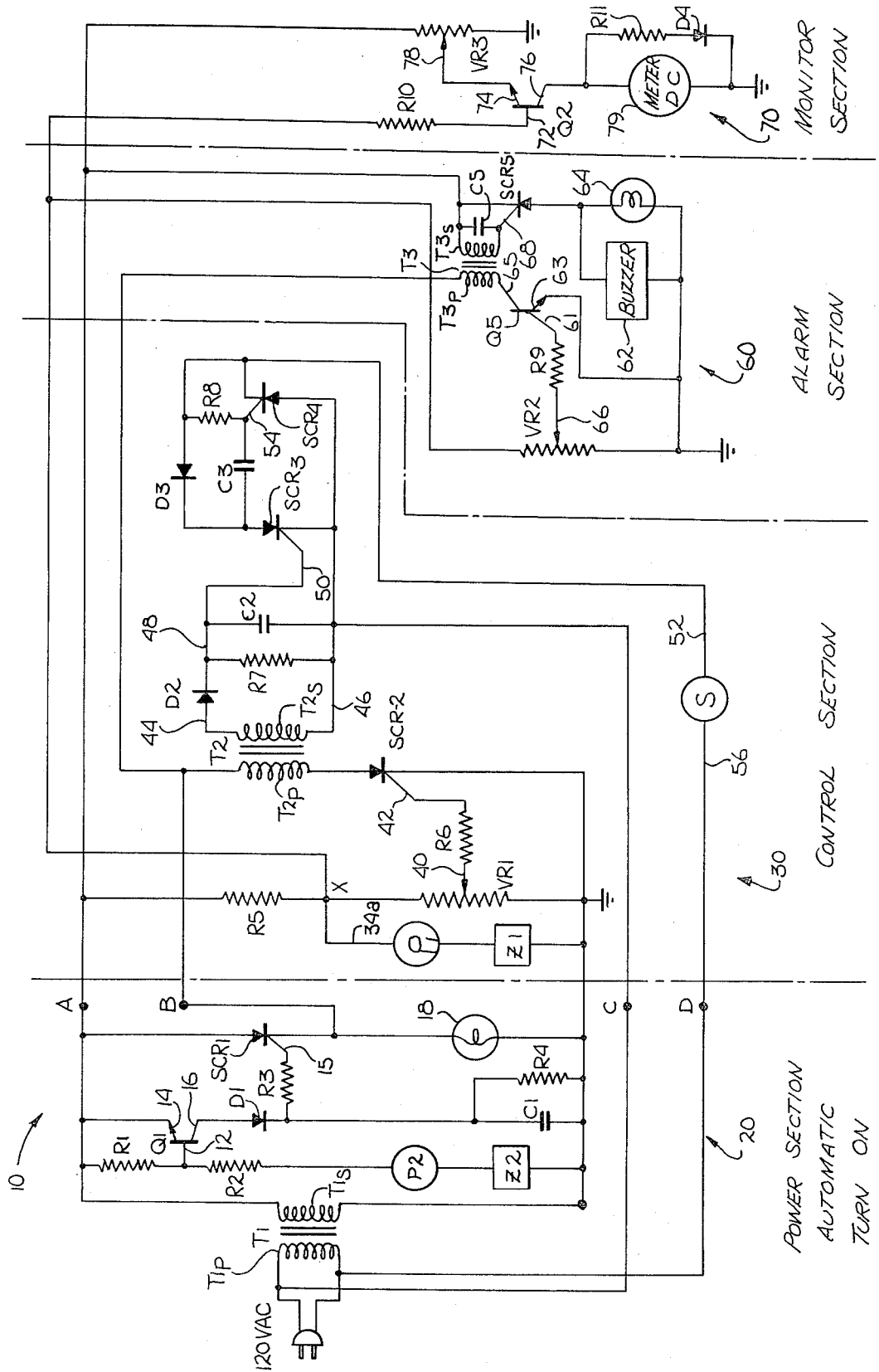

AC SOLENOID CONTROL CIRCUIT

BACKGROUND OF THE INVENTION

1. Field of the Invention

This invention relates to solid state electronic control circuits, and more particularly to a novel circuit for the control of AC solenoids.

2. Prior Art

A number of different electronic circuits for controlling AC solenoids are disclosed by the prior art. However, these circuits typically suffer from one or more limitations or shortcomings. Generally, it has heretofore not been possible to achieve very sharp turn-on and turn-off of an AC solenoid with substantially no bounce. Some circuits of the prior art disclose the use of triacs in combination with silicon controlled rectifiers (SCR'S) for the control of AC solenoids. However, triacs are not satisfactory in inductive circuits due to their sensitivity to the inductive spikes which are typically generated. In addition, triacs in a solenoid control circuit tend to introduce delay, bounce and undesirable phase shifting, the latter causing a reduction in current through the solenoid. Circuits of the prior art which use silicon controlled rectifiers alone, i.e., without triacs, have typically been limited to the control of DC solenoids. This limitation exists because, heretofore, in AC solenoid applications, SCR'S have been unable to achieve the desired sharpness of turn-on and turn-off with negligible solenoid bounce.

The present invention overcomes these limitations and shortcomings of the prior art by disclosing a novel circuit capable of controlling AC solenoids without the introduction of delay bounce or phase shifting. In addition, the invented circuit exhibits very sharp turn-on and turn-off characteristics. The invented circuit does not utilize triacs or relays, but instead makes optimum use of silicon controlled rectifiers.

In applications where an AC solenoid is used to control a particular parameter of an operating system such as, for example, the concentration of a material in a fluid, the solenoid control circuit necessarily includes a means for sensing the controlled parameter. In the prior art, when the parameter being controlled has been the concentration of a material in a fluid, relatively large, high impedance probes have been disposed within the interior of the fluid bath to function as sensors. Such probes are responsive to the conductivity (or impedance) of the fluid bath which, in turn, is generally a function of the concentration of the material being controlled. Typically, the probes disclosed by the prior art for use in such applications are 6–7 inches in length, thereby extending well into the interior of the fluid bath. As a result, the impedance of the fluid between the end of a typical probe of the prior art and the circuit return (or ground) is relatively high. This high ambient impedance results in the probe being relatively insensitive to small changes in the conductivity of the fluid attributable to small variations in the concentration of the material being controlled. At the same time, however, such high impedance probes are relatively sensitive to changes in conductivity caused by variations in the temperature of the fluid. Thus, a control system using such a probe, if operated at a fluid temperature below its normal range, may dispense detergent, not in response to a need, but, erroneously, in response to a decrease in the fluid temperature. A further disadvantage of the large probes typical of the prior art is that, due to their relatively large length, they tend to introduce additional errors into the control system; i.e., they add a non-negligible series impedance to the electrical path through the fluid bath, an impedance which varies as the temperature of the fluid varies. As a result, the control circuit erroneously attempts to correct for what appears to be a change in the concentration of the controlled material.

Besides their electrical shortcomings, the probes disclosed by the prior art have certain physical disadvantages. For one thing, they are often relatively fragile. Secondly, because they extend well into the interior of the fluid bath, they are subjected to the relatively high flow and/or operating forces typically present in the interior of the bath, thereby increasing the risk of their being physically damaged. Further by extending into the interior of the bath, they are prone to cause clogging.

The present invention overcomes these shortcomings and disadvantages of the prior art by teaching the use of a relatively small, low impedance probe in combination with a solenoid control circuit. In comparison to probes of the prior art, the low impedance probe disclosed by this invention is more sensitive to variations in the concentration of the controlled material, and, yet, less sensitive to temperature variations of the fluid. It, therefore, makes possible finer and more accurate control than heretofore attainable.

In an application where the concentration of a detergent in a commercial dishwasher is being controlled by the operation of a solenoid in a dispensing apparatus, the relative insensitivity of prior art circuits and probes typically results in periods of detergent deficiency, before correction is attempted, and periods of excess concentration due to overcompensation. The former conditions results in a reduction in the quality of cleaning, while the latter condition is wasteful of relatively expensive detergents. It is also not uncommon for control circuits of the prior art, in a detergent control application, to hang up in zero slope regions of the conductivity-to-concentration curve. In these regions, large changes in concentration have relatively little effect on the concentration of the washing bath, and control becomes ineffective and wasteful. The present invention overcomes these disadvantages of the prior art for controlling detergent concentration in a dishwashing apparatus by disclosing a highly accurate control circuit capable of fine resolution in its control responses. The present invention substantially reduces the possibility of the control circuit becoming hung up in the zero-slope region of the conductivity-to-concentration curve. In addition, while probes and circuits of the prior art typically operate effectively only with a water temperature in the range of 140° F – 165°F, the present invention is capable of effective control at water temperatures as low as 90°F.

In an application where the concentration of a detergent (or other material) is being controlled, the prior art teaches the use of an alarm circuit for indicating when the concentration falls to a predetermined critical level. The prior art alarm circuits typically use a thermal delay tube (one of which is commonly known by the trademark "AMPRITE"). The thermal delay tube is energized when the control circuit activates the solenoid in order to intake additional detergent. If the solenoid remains activated at the end of the thermal delay period (typically 60 seconds), the alarm is triggered. Thus, it is possible for the entire thermal delay period to elapse before the operator is made aware that the detergent reservoir is depleted. Meanwhile, the dishwashing apparatus will have been operating with a detergent deficiency. The present invention overcomes this limitation of the prior art by disclosing a means for directly monitoring the concentration of detergent and issuing the alarm immediately upon detecting that the predetermined alarm concentration has been reached. In addition, the present invention eliminates the relatively expensive thermal delay tube.

A further advantage of the present invention lies in its not requiring amplification stages in the circuitry which responds to the changes in the sensed (monitored) parameter.

Thus, while certain solenoid control circuits are disclosed by the prior art, there has heretofore been no low power AC solenoid control circuit which has all of the features and advantages found in the present invention.

BRIEF SUMMARY OF THE INVENTION

The present invention is a solid state low power circuit for controlling the application of power to an AC solenoid. The invention is comprised of a control section and a power section. An additional alarm section and an additional monitor section may be advantageously used in conjunction with the present invention in certain applications. However, neither the alarm section nor the monitor section is necessary to this invention herein disclosed.

A preferred embodiment of the present invention is particularly suitable for controlling the supply of a material into a fluid of an operating system by activating an AC solenoid when additional material is required. The solenoid typically controls a dispending apparatus which supplies the material to the fluid. When activated, the solenoid causes the material to be dispensed into the fluid.

In this preferred embodiment, the control section is comprised of a small, low impedance probe disposed within the fluid and electrically coupled to a circuitry which produces an analog signal whose amplitude is inversely proportional to the concentration of the material in the fluid, as detected by the probe; a trigger circuit which is fired whenever the amplitude of the analog signal exceeds a predetermined voltage level; and switching circuitry which is transformer coupled to the trigger circuit and which, in response to each firing of the trigger circuit, switches AC power across the solenoid for the next full cycle of power. The switching circuitry includes a pair of silicon controlled rectifiers, each one of which conducts during alternate half-cycles of the AC power cycle after the firing of the trigger circuit. A pair of capacitors provide the voltage and necessary delays required for firing the SCR'S sequentially. A diode connected between the two SCR'S tends to absorb any inductive spikes that might be generated by the solenoid.

The power section of this preferred embodiment operates directly from a conventional power source, independent of the electrical system of the operating system. The advantage of this feature is that it enables the present invention to be readily installed in existing operating systems without electrical rewiring. In some places, safety and electrical codes might preclude retrofitting of an installation if it requires interconnections to its electrical power pack. The power section transforms the conventional AC power to the relatively low amplitude required by the control section.

In addition, in this preferred embodiment, the power section has an automatic turn-on capability; i.e., it turns on automatically when the operating system is put into operation. This novel feature eliminates the possibility of human error such as, for example, the operator forgetting to turn on the solenoid control circuit when the operating system is in operation. The automatic turn-on capability is provided by the use of a small low impedance probe disposed in the vicinity of the supply outlet of the fluid used by the operating system. The probe is electrically coupled to a transistor circuit. When the operating system is activated, the fluid, typically water, intermittently bathes the probe, causing the conductivity between the probe and circuit ground, typically a tank which contains the fluid, to increase. The increase in conductivity is used to cause a transistor to go into conduction. The current through the transistor, in turn, switches power to the control section, preferably through a silicon controlled retifier. When the operating system is turned off, the inflow of the fluid ceases, the conductivity between probe and circuit ground increases, the transistor ceases to conduct, and the power switching means is reset.

The optional alarm section is comprised of circuitry which fires a silicon controlled rectifier when the analog signal, whose amplitude is inversely proportional to the concentration of the matter in the fluid, exceeds a predetermined alarm voltage level; i.e., when the concentration of the material falls below a minimum acceptable level. When the SCR fires, a visual and/or audio alarm is issued. The optional monitor section includes a meter which is electrically coupled to the analog signal, providing a continuous readout of the concentration of the material in the fluid, when properly calibrated.

Thus, it is a principal object of the present invention to disclose a low power AC solenoid control circuit which is capable of turning a solenoid on and off with a relatively high degree of sharpness and without bounce, delay or phase shifting.

It is another principal object of the present invention to provide an AC solenoid control circuit which is adapted to control the supply of a material in a fluid of an operating system to a desired level with greater accuracy and finer resolution than heretofore attainable.

It is a further object of this invention to provide an AC solenoid control circuit which has an automatic turn-on capability.

It is a still further object of this invention to disclose the use of a small, reliable, low impedance probe in an AC solenoid control circuit adapted to control the supply of a material in a fluid, which probe is relatively insensitive to temperature changes of the fluid.

Other objects, novel features and advantages of the present invention will become apparent upon making reference to the following detailed description and the accompanying drawings. The description and the drawings will also further disclose the characteristics of this invention, both as to its structure and its mode of operation. Although a preferred embodiment of the invention is described hereinbelow, and shown in the accompanying drawings, it is expressly understood that the description and drawings thereof are for the purpose of

BRIEF DESCRIPTION OF THE DRAWINGS

FIG. 2 is an electrical schematic of a presently preferred embodiment of the present invention, including an optional alarm section and an optional monitor section.

DETAILED DESCRIPTION OF THE INVENTION

Figure 1:
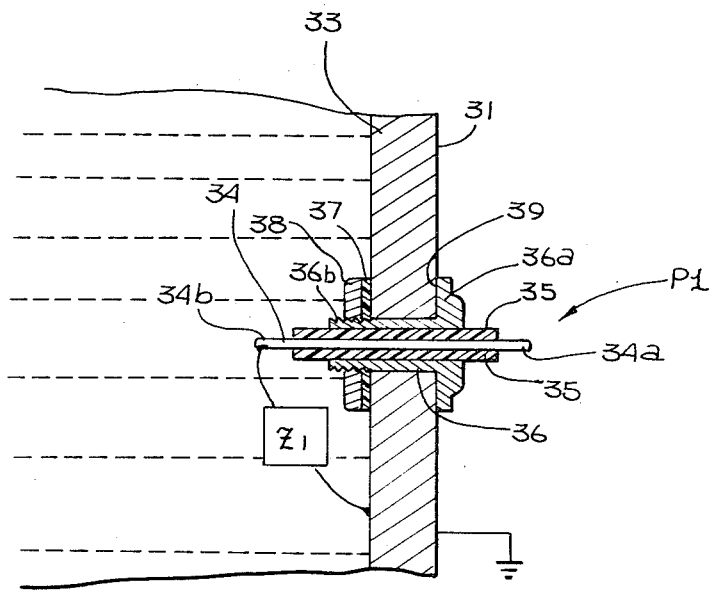
FIG. 1 is a cross-sectional view of a low impedance probe installed in the wall of a tank containing a fluid.

The present invention 10 is an electronic AC solenoid control circuit comprising a power section 20 and a control section 30. In certain applications, an additional alarm section 60 and/or an additional monitor section 70 may beadvantageously used in conjunction with the invention; however, it should be understood that alarm section 60 and monitor section 70 are optional and that neither is necessary to this invention.

With reference to FIGS. 1–2, the present invention 10 is disclosed by describing in detail the structure and operation of a preferred embodiment thereof particularly adapted to controlling the concentration of detergent in a washing bath such as, for example, in a commercial dishwashing apparatus. In order to control the concentration of the detergent in the solution, an AC solenoid S is utilized. The solenoid S controls a dispensing apparatus which starts and stops the flow of detergent from a storage reservoir into the washing bath. This invention is adapted to operate with solenoids rated from 1–150 watts. Proper concentration of the detergent in the washing bath is achieved by applying power to the solenoid S when the actual concentration of detergent falls below a desired concentration, and removing power from the solenoid S when the actual concentration equals the desired concentration. Optimum control of the concentration, of course, requires the substantially instantaneous flow of detergent into the washing bath when a deficiency is detected, and a substantially instantaneous stopping of the flow thereof when the desired concentration is attained. In this manner, both significant deficiencies and over supplies of detergent in the solution are precluded.

The control section 30 of the present invention controls the energizing of solenoid S so as to achieve, to a substantial extent, the optimum control of detergent concentration. Control section 30 comprises means for determining the concentration of detergent in the washing bath, means for determining when the detected concentration falls below the desired concentration, and means for energizing the solenoid S until the detected concentration equals the desired concentration, at which time the solenoid S is de-energized.

The means for determining the concentration of detergent in the washing bath is a low impedance probe P1 mounted through the wall 33 of a tank containing the bath below the water line as shown in detail in FIG. 1. Probe P1 is comprised of an inner conductor 34, typically a stainless steel of nickel alloy wire approximately one-sixteenth inch in diameter and three-fourths inch in length, an insulating sheath 35 surrounding inner conductor 34 over its entire length, except for ends 34a and 34b, and a metallic outer member 36 surrounding the central portion of insulating sheath 35 and having a lug 36a at one end thereof and conventional threads at end 36b. The threads at end 36b of the outer member 36 are adapted to receive a rubber or nylon washer 37 and nut 38 to form a water tight seal with the tank wall 33. Probe P1 is securely mounted to the wall 33 of the tank through a hole therein, the end face 39 of lug 36a being placed flush against the outer surface 31 of the tank. The end 34a of probe P1 is connected to the junction of a resistor R5 and a variable resistor VR1 in control section 30, which junction is designated by the letter X as shown in FIG. 2. The end 34b of probe P1 is electrically coupled to the wall 33 of the tank through the washing bath, the wall 33 being utilized as circuit ground. An impedance Z1 is the equivalent impedance of the relatively small volume of washing bath in the space between end 34b of probe P1 and the wall 33. The impedance of Z1 is a function of several variables which include (i) the concentration and type of detergent in the washing bath, (ii) the temperature of the water, (iii) the mineral content of the water, and (iv) other impurities in the solution such as, for example, residues of food. The temperature of the water and the type of detergent used are readily controlled. The mineral content of the water is substantially constant in a given area and, therefore, can be adjusted for. The effect of other impurities on the impedance Z1 is typically negligible compared to the effect of the concentration of detergent. Thus, the impedance of Z1 is substantially a variable function of the concentration of the detergent in the solution. The function is an inverse one; i.e., the greater the concentration of detergent, the lower the impedance of Z1 and vice-versa. Significant advantages derived by using probe P1 include (i) the relatively low impedance of Z1, (ii) the sensitivity of Z1 to variations in the concentration of detergent in the bath, and (iii) the insensitivity of Z1 to changes in the temperature of the bath. This is due to the small dimensions of probe P1 and the close proximity of end 34b to the wall 3 of the tank (circuit ground). The sensitivity of the impedance of Z1 to variations in the detergent concentration enables the present invention 10 to be highly responsive to such variations and, thereby, to maintain the detergent concentration at a level very close to the desired concentration.

With reference to FIG. 2, the power section 20 and control section 30 of the invented circuit 10 are described. The preferred embodiment of power section 20 described herein has a novel automatic turn-on capability achieved by utilizing a second low impedance probe P2 which is substantially identical to probe P1 shown in FIG. 1 and described hereinabove. Probe P2 is typically secured to the wall 33 of the washing tank at a position which, while above the water line, nevertheless subjects the probe P2 to an intermittent bath of water when water jets, typically utilized in a commercial dishwashing apparatus, are activated. When probe P2 is bathed by water from the water jets, a low impedance bath exists between the interior end of the probe P2 (analogous to end 34b of probe P1) and the wall 33 of the tank. An impedance Z2 is the equivalent impedance of the relatively small volume of water in the space between the interior end of probe P2 and the wall 33. As explained more fully below, the electrical path to circuit ground provided by impedance Z2, when the water jets are activated, is used automatically to switch power to the circuitry of control section 30.

At the front end of power section 20 is a step-down transformer T1 having a primary winding $T1_p$ connected to a conventional 120 volts AC power source. Transformer T1 typically steps the source voltage down to about 6.3 volts RMS. A secondary winding $T1_s$ of transformer T1 is connected between circuit ground and a power line designated by the letter A. Resistors R1 and R2 and probe P2 are connected in series to circuit ground through impedance Z2. The junction between resistors R1 and R2 is connected to the base 12 of a transistor Q1. Emitter 14 of transistor Q1 is connected to power line A, while collector 16 thereof is electricaly coupled to the control leg 15 of a silicon controlled rectifier SCR1 through a diode D1 and resistor R3. The anode of SCR1 is connected to power line A, and the cathode thereof is connected to a second power line designated by the letter B. A conventional lamp 18 is connected between power line B (cathode of SCR1) and circuit ground in order to provide an indication of the presence of power on power line B. A capacitor C1 and a resistor R4 are connected in parallel between the cathode of diode D1 and circuit ground.

The 120 volts AC power source is carried directly to the control section 30 on power lines C and D. In this embodiment, solenoid S is a 120 volt AC solenoid, and the basic function of control section 30 is to connect the 120 volt AC power on power lines C and D across solenoid S when it detects a detergent deficiency.

The operation of the power section 20 is now described. When the dishwashing apparatus is inactive, i.e., when there is no water bathing probe P2, impedance Z2 appears as an open circuit. Thus, the voltage at base 12 of transistor Q1 is equal to the voltage on power line A, namely, 6.3 volts RMS. With this voltage on base 12, transistor Q1 is biased off. As a result, SCR1 is in a non-conducting state and no power appears on power line B. When the dishwashing apparatus is activated, impedance Z2 provides an electrical path to circuit ground. Immediately, resistors R1 and R2 and impedance Z2 divide the voltage on power line A at the base leg 12 of transistor Q1. The impedance Z2 is typically low and substantially constant for water having a particular mineral content. Thus, resistors R1 and R2 are selected so that the resulting voltage division removes the bias on transistor Q1, causing it to go into conduction. During the positive half cycles of the voltage on power line A, when the voltage is increasing toward its peak amplitude, diode D1 is forward biased. As a result, (i) a positively increasing voltage appears on control leg 15 of SCR1 and (ii) capacitor C1 is charged positively. The positive voltage on control leg 15 causes SCR1 to fire. SCR1 continues to conduct until the voltage on power line A goes into its negative half cycle. When the voltage on power line A begins its next positive half cycle, the above-described sequence is repeated. It continues so long as transistor Q1 is not biased off, or, in other words, as long as probe P2 is bathed with water from the overhead water jets. During this "on" condition, therefore, SCR1 conducts during each of the positive half cycles of the voltage on power line A. Each time capacitor C1 is charged, it retains sufficient voltage to fire SCR1 during every positive half-cycle for the next 3–5 seconds (while slowly discharging through resistor R4). Thus, the delay introduced by capacitor C1 ensures that the power signal appearing on power line B is not discontinuous due to the intermittent bathing of probe P2. Thus, in a turn-on condition, the voltage on power line B is a continuous positive half-wave signal, substantially in phase with the voltage on power line A. As will be seen hereinbelow, the voltage on power line B energizes the circuitry of control section 30.

With reference again to FIG. 2, control section 30 is described. Resistor R5 and variable resistor VR1 are serially connected between power line A and circuit ground, their junction being at point X. As described hereinabove, the exterior end 34a of probe P1 is connected to point X and its interior end 34b is electrically coupled to circuit ground through equivalent impedance Z1. Thus, impedance Z1 is electrically in parallel with the full resistance of variable resistor VR1. The voltage at point X, $V_x$, is therefore the voltage on power line A divided by resistor R5 and the parallel combination of VR1 and Z1. It can readily be seen that as Z1 increases, voltage $V_x$ increases and vice-versa. Since impedance Z1 is inversely proportional to the concentration of detergent in the washing bath. voltage $V_x$ is likewise inversely proportional to the concentration of the detergent. Thus, voltage $V_x$ is an inverse analog of the concentration of detergent, or a direct analog of the need for additional detergent. Resistor R6 is connected between the variable resistance leg 40 of VR1 and the control leg 42 of a second silicon controlled rectifier SCR2. The primary winding $T2_p$ of a peaking transformer T2 and SCR2 are serially connected between power line B and circuit ground. Since the voltage on power line B is a positive half-wave, SCR2 is connected so as to be forward biased by a positive voltage. The secondary winding $T2_s$ of transformer T2 has leads 44 and 46. Lead 44 is coupled through diode D2 to one side 48 of a parallel combination of a resistor R7 and a capacitor C2. Lead 46 is connected to the second sides of resistor R7 and capacitor C2. Lead 46 is also connected to power line C, i.e., to one side of the 120 volts AC power source. Side 48 of resistor R7 and C2 is connected to control leg 50 of a third silicon controlled rectifier SCR3. The cathode of SCR3 is connected to power line C, while its anode is coupled to a first lead 52 of solenoid S through a diode D3. Diode D3 is placed in the same direction of current flow as SCR3. A fourth silicon controlled rectifier SCR4 is connected between power line C and lead 52 of solenoid S, its cathode being connected to lead 52 and its anode to power line C. A capacitor C3 couples control leg 54 of SCR4 to the anode of SCR3. A resistor R8 is connected between control leg 54 of SCR4 and the cathode of SCR4, resistor R8 providing a charge and discharge path for capacitor C3. Finally, a second lead 56 of solenoid S is connected to power line D, the second side of the 120 volts AC power source.

The operation of control section 30 is now described. Initially, variable resistor leg 40 of VR1 is adjusted so that the trigger voltage for SCR2 appears on control leg 42 when the peak of voltage $V_x$ reaches the "need" value. The latter occurs at the peak of a positive half cycle of the voltage on power line A, when the concentration of detergent is at the threshold of being unacceptably low. In practice, positions of variable resistor leg 40 are typically calibrated for various concentrations required for particular detergents. When $V_x$ equals or exceeds the "need" value, SCR2 is fired into a conducting state. Since the voltage on power line B is substantially in phase with the voltage on power line A, conduction of current takes place through primary winding $T2_p$ for that portion of the positive half cycle when voltage $V_x$ is equal to or greater than the "need" value. As a result, a positive voltage pulse is passed by the peaking transformer T2, charging capacitor C2 and causing a positive voltage to appear on control leg 50 of sCR3. Since the voltage on power line C is substantially in phase with the voltages on power lines A and B, power line C is in the positive half of its cycle with respect to power line D when the positive voltage appears on control leg 50. Thus, SCR3 and diode D3 are back biased and SCR3 is not fired. However, the voltage on capacitor C2, while being discharged through resistor R7, is sufficient to fire SCR3 at the start of the next negative half cycle of power line C when SCR3 and diode D3 are forward biased. Thus, solenoid S is energized during the entire negative half cycle of power line C after the value of $V_x$ reaches the "need" value.

Meanwhile, during the time SCR3 is conducting, capacitor C3 is charged through resistor R8 to the forward voltage across diode D3, to at least +0.5 volts. This voltage is typically greater than the voltage required to fire SCR4. When the voltage on power line C goes into its next positive half cycle, SCR4 becomes forward biased. Since at this time, the positive voltage on capacitor C3 is present on its control leg 54, SCR4 is fired. As was the case with capacitor C2, the voltage on capacitor C3, while slowly discharging through R8 and diode D3, remains high enough to fire SCR4 at the start of the next positive half cycle of power. Thus, SCR4 conducts for the entire positive half cycle of the voltage on power line C, thereby energizing solenoid S during that period. It is seen then that once voltage $V_x$ reaches the "need" value and SCR2 is triggered into conduction, the solenoid is energized for at least the full cycle of 120 volts AC power (negative half-cycle followed by positive half-cycle) immediately following the time when the "need" value is reached. During the time the solenoid S is energized the detergent is passed into the water tank. Because of the typically great turbulence of the water in the tank, the concentration of detergent therein increases nearly instantaneously. If, during the next positive half cycle of the voltage on power line A, $V_x$ does not reach the "need" value, solenoid S will be energized for only one full cycle at 120 volts AC power. If, on the other hand, the detergent deficienct remains unsatisfied, then solenoi S will be energized for at least another full cycle of 120 volts AC power in the manner just described. The above-described sequence continues until the amplitude of $V_x$ is less than the "need" value required to fire SCR2 for a particular setting of variable resistor leg 40 of VR1.

Solenoid S presents an inductive load to the control section. Inductive spikes generated by switching the solenoid on and off can cause SCR3 to fire, thereby continuing the supply of detergent after the need is satisfied. Diode D3 eliminates this problem by supressing such inductive spikes.

In the event that the detergent reservoir were depleted, the control section 30 would continue indefinitely to energize solenoid S, but the detergent deficiency would, of course, remain unsatisfied. In order to preclude this from occurring, it is desirable to add alarm section 60 to the basic invention 10. The alarm section 60 comprises (i) a variable resistor VR2 connected between point X and circuit ground, (ii) a transistor Q5 having a base leg 61, emitter leg 63 and collector leg 65, the emitter leg 63 being connected to circuit ground and the base leg 61 being coupled to a variable resistance leg 66 of VR2 through a resistor R9; a peaking transformer T3 having a primary winding $T3_p$ and a secondary winding $T3_s$, the primary winding $T3_p$ being connected to collector leg 65 of transistor Q5; a fifth silicon controlled rectifier SCR5 connected in series with a parallel combination of a conventional buzzer 62 and a conventional lamp 64 between power line A and circuit ground, its control leg 68 being connected to the secondary winding $T3_s$; and a filter capacitor C5 is connected across secondary winding $T3_s$, all as shown in FIG. 2. In operation, the voltage across VR2 equals $V_x$, the voltage which is the analog of the "need" for detergent. As the need increases, the voltage across VR2 increases. The variable resistance leg 66 is typically set at a position which turns Q5 on when the need for detergent reaches a predetermined alarm level. When Q5 conducts, during a positive half cycle of the voltage on power line B, a pulse is passed through transformer T3 charging capacitor C5 and causing SCR5 to fire during the next negative half cycle of the voltage on power line A (when SCR5 is forward biased). When SCR5 conducts, the buzzer 62 and the lamp 64 are energized by the voltage on power line A, thereby providing an audio and visual indication of the alarm condition to the operation. In practice, positions of variable resistance leg 66 are typically calibrated for various alarm levels for particular detergents.

The monitor section 70 is another optional section with which the basic invention 10 is adapted to operate. Monitor section 70 provides an electronic titration meter readout of the concentration of detergent in the water bath. A third variable resistor VR3 is connected between power line A and circuit ground. A transistor Q2 having a base leg 72, an emitter leg 74 and a collector leg 76 is connected as follows: base leg 72 is electrically coupled through a resistor R10 to point X; emitter leg 74 is connected to a variable resistance leg 78 of VR3; and collector leg 76 is connected to a variable resistance leg 78 of VR3; and collector leg 76 is connected to one side of a DC ammeter 79. The second side of ammeter 79 is tied to circuit ground. A resistor R11 and diode D4 are connected in series across the ammeter 79, the cathode of diode D4 being connected to circuit ground. In operation, the voltage at base leg 72 is substantially equal to $V_x$, the latter being inversely proportional to the concentration of detergent. Depending upon the setting of base leg 72, current will flow through Q2 and through the ammeter 79 during negative half cycles of the voltage on power line A. Diode D4 and resistor R4 comprise a dampening circuit and substantially eliminate jitter in the ammeter 79 (due to current leakage through Q2 during positive half-cycles). At a given setting of leg 78, the DC component of the current through the ammeter is directly proportional to the voltage on base leg 72, $V_x$. Thus, as the concentration of detergent decreases, the deflection of the ammeter 79 increases. Since the current-to-detergent concentration function is substantially linear over the operating range of the system, the ammeter 79 can be calibrated, by appropriately setting leg 78, to show detergent concentrations from an alarm condition to a need threshhold condition to a satisfactory condition.

Figure 3:
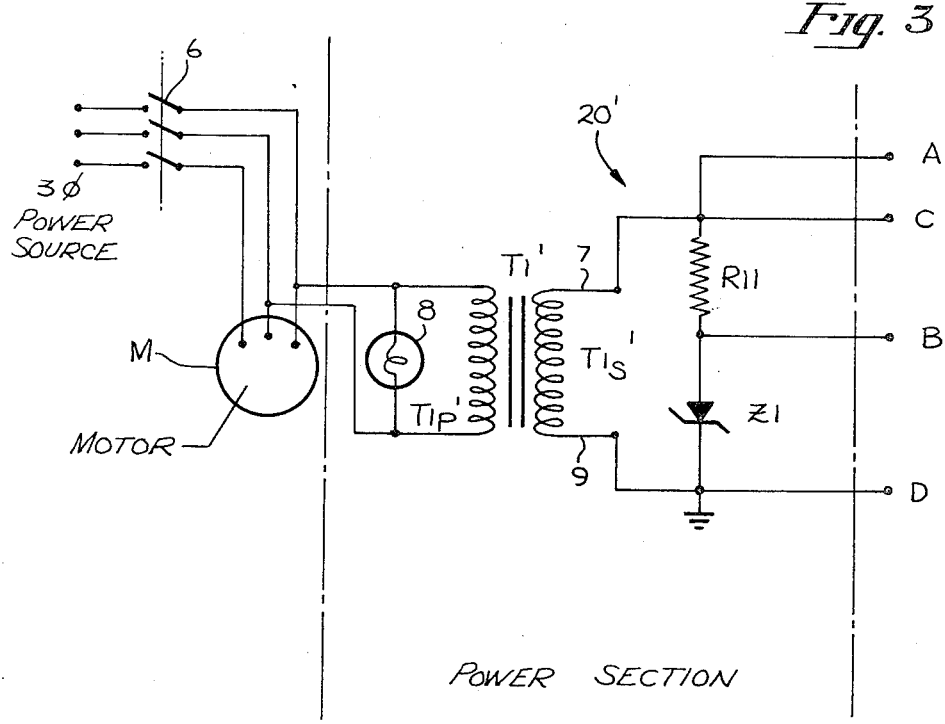
FIG. 3 is an electrical schematic of a second embodiment of the power section of the present invention adapted to operate off a single phase of a three phase power source.

In FIG. 3, an alternate embodiment of the power section 20' is shown. Power section 20', adapted to operate with a 24 volt AC solenoid instead of the 120 volt AC solenoid S, does not have automatic turn-on capability. Typically, a dishwashing apparatus utilizes a three phase electric motor M which is energized by throwing a conventional power switch 6. The power for power section 20' is a single phase of the three phase source to motor M taken from the motor side of switch 6. Thus, in embodiments of the present invention utilizing power section 20', power comes on with the manual throwing of switch 6. A primary winding $T1_p'$ of a voltage reducing transformer T1' and a conventional lamp 8 are placed in parallel across a single phase of th power source. The lamp 8 provides a visual indication that power is on. A reduced voltage, typically 24 volts RMS, appears across a secondary $T1_s'$ of transformer T1'. A side 7 of $T1_s'$ is used as power lines A and C, while a second side 9 is tied to circuit ground and used as line D. As before, power lines C and D apply power across solenoid S through the circuitry of control section 30. A resistor R11 and zener diode Z1 are serially connected between power line C and circuit ground. Power line B is taken off the junction of zener Z1 and resistor R11. Zener Z1, typically 12 volts, limits the amplitude of the voltage on power line B. Unlike power section 20, the voltage on power line B from power section 20' is not a positive half-wave signal. It is full-wave, except for the clipping by zener Z1 during positive half cycles. Since control section 30 operates only on the positive half cycles of the voltage on power line B, the negative half cycles on power line B, when power section 20' is utilized, are not significant.

A disadvantage of power section 20' relative to power section 20 is that it requires some retrofitting on existing dishwashers; i.e., connecting to the motor M and to switch 6, whereas power section 20 is independent of the electrical system of an existing dishwasher.

The present invention 10, when utilized in the dishwasher detergent control application described hereinabove, demonstrates highly advantageous operating characteristics. For one thing, it enables very sharp turn-on and turn-off of the solenoid S, with substantially no bounce. Secondly, the resolution and sensitivity of control section 30 are very great. For example, as little as 0.1 ounce of detergent solution can be dispensed as a minimum increment for correcting a detergent deficiency. As indicated earlier, it is the low impedance probes, P1 and P2, which, because of their high degree of sensitivity to variations of the conductivity of the water bath make possible the control sensitivity and resolution of the present invention. Further, the use of probes P1 and P2, as disclosed by this invention, enables the substantial elimination of the errors typically introduced by the larger probes of the prior art. These errors are attributable to the variable conductivity of the probes themselves, and to their sensitivity to variations of the water temperature.

In packaging the preferred embodiment of this invention, for purposes of operator safety, the peaking transformer T2 and the switching circuitry comprising SCR3 and SCR4 are made physically inaccessible to the operator. Thus, by isolating that portion of the control section 30 which is tied to the high voltage of power line C from the remaining low voltage circuitry, the operator is not exposed to a potentially lethal voltage.

Although the present invention has been disclosed and described with reference to particular embodiments for use with a dishwashing apparatus, the principles involved are susceptible of other embodiments and other applications which will be apparent to persons skilled in the art. Those skilled in the art will readily understand that various changes in form, detail and application of the invented circuit may be made therein without departing from the spirit and scope of the invention. Thus, this invention is not intended to be limited to the particular embodiments herein disclosed.

I claim:

1. In a control system for regulating the supply of a detergent in a washing bath of a dishwashing apparatus having a tank for containing said bath and a plurality of water jets, wherein an AC solenoid is utilized to control the dispensing of said detergent into said tank, an AC solenoid control circuit comprising:

a. a voltage reducing transformer means having a primary side and a secondary side, said primary side being electrically coupled to a conventional source of AC power, and said secondary side providing a first AC power signal, said first AC power signal being substantially in phase with said conventional source;

b. a first low impedance probe having an insulated inner conductor approximately one-sixteenth inch in diameter and approximately three-fourths inch in length with first and second ends, said first probe being sealedly secured through a hole in a wall of said tank at a position in which water from said water jets will at least intermittently bathe said first end of said first probe when said dishwashing apparatus is activated, said second end of said first probe being disposed exterior to said tank, said tank being connected to circuit ground;

c. switching means energized by said first AC power signal and electrically coupled to said second end of said first probe, said switching means being adapted to provide a second AC power signal when water from said water jets intermittently bathes said first end of said probe, said second AC power signal being a half-wave rectified derivative of said first AC power signal and substantially in phase therewith;

d. a second low impedance probe having an insulated inner conductor approximately one-sixteenth inch in diameter and approximately three-fourths inch in length with first and second ends, said second probe being sealedly secured through a hole in a wall of said tank at a position below the water line, said first end thereof being disposed within said washing bath and said second end thereof being disposed exterior to said tank;

e. voltage dividing means having an input electrically coupled to said second end of said second probe, said voltage dividing means providing at its output an analog signal whose amplitude is a function of the concentration of said detergent in said bath, said voltage dividing means being energized by said first AC power signal;

f. means for generating a trigger signal when the amplitude of said analog signal exceeds a predetermined trigger level, said trigger generating means being electrically coupled to said output of said voltage dividing means, said trigger generating means being energized by said second AC power signal;

g. first and second silicon controlled rectifiers (SCR'S) electrically coupled to conduct in opposite directions between said solenoid and said conventional power source, each of said SCR'S having a control leg;

h. a diode electrically coupled in series with said first SCR;

i. a first capacitor electrically coupled to said trigger generating means and to said control leg of said first SCR, said first capacitor being adapted to charge when said trigger voltage appears; and j. a second capacitor electrically coupled in parallel across said diode and to said control leg of said second SCR, said second capacitor being adapted to charge when said first SCR conducts, whereby, when said dishwashing apparatus is activated, said trigger generating means is energized by said second AC power signal, and following the appearance of said trigger signal, the voltage stored on said first capacitor causes said first SCR to fire when the latter is forward biased during a first half-wave of said conventional power source, and the voltage stored on said second capacitor causes said second SCR to fire when the latter is forward biased during a second half-wave of said conventional power source, said sequential firing of said SCR'S causing said conventional power source to be switched across said solenoid until the concentration of said detergent in said bath reaches a desired level, said desired level causing said amplitude of said analog signal to fall below said predetermined trigger level.

2. In a control system for regulating the supply of a material in a fluid, wherein an AC solenoid is utilized to control the dispensing of said material into said fluid an AC solenoid control circuit comprising:

a. a power section adapted to provide AC power to said solenoid and to said control circuit;

b. means responsive to the concentration of said material in said fluid, said responsive means providing at its output an analog signal whose amplitude is a function of the concentration of said material in said fluid;

c. means for generating a trigger signal when the amplitude of said analog signal exceeds a predetermined trigger level, said means for generating a trigger signal being electrically coupled to said output of said responsive means;

d. first and second silicon controlled rectifiers (SCR'S) electrically coupled to conduct in opposite directions between said solenoid and said AC power, each of said SCR'S having a control leg;

e. diode means electrically coupled in series with said first SCR;

f. a first capacitive element electrically coupled to said means for generating a trigger signal and to said control leg of said first SCR, said first capacitive element being adapted to charge when said trigger voltage appears; and g. a second capacitive element electrically coupled across said diode means and to said control leg of said second SCR, said second capacitive element being adapted to charge when said first SCR conducts, whereby, following the appearance of said trigger signal, the sequential firing of said first and second SCR'S causes said solenoid to be energized by said power source until said concentration of said material in said fluid reaches a desired level, said desired level causing said amplitude of said analog signal to fall below said predetermined trigger level.

3. The circuit of claim 2 wherein following the appearance of said trigger signal, the voltage stored in said first capacitive element causes said first SCR to fire when the latter is forward biased during a first half-wave of said AC power source, and the voltage stored on said second capacitive element causes said second SCR to fire when the latter is forward biased during a second half-wave of said AC power.

4. The circuit of claim 10 wherein said material is a detergent and said fluid is a water solution of said detergent in a washing tank of a dishwashing apparatus, and said responsive means comprises:

i. a low impedance probe sealedly secured through a hole in a wall of said tank at a position below the water line, said probe having an insulated inner conductor with first and second ends, said first end thereof being disposed within said water solution and said second end thereof being disposed exterior to said tank; and ii. voltage dividing means electrically coupled to said second end of said probe, the output of said voltage dividing means being said analog signal, the amplitude of said analog signal being inversely related to the conductivity of said water solution and to the concentration of said detergent therein, said responsive means being relatively insensitive to temperature variations of said water solution.

5. The circuit of claim 2 having in addition thereto means for issuing an alarm signal whenever the concentration of said material in said fluid falls below a predetermined alarm level, said alarm means being electrically coupled to said analog signal and being adapted to respond when the amplitude of said analog signal reaches a level corresponding to said predetermined alarm level.

6. In a control system for regulating the supply of a material in a fluid, wherein an AC solenoid is utilized to control the dispensing of said material into said fluid, an AC solenoid control circuit comprising:

a. transformer means having a primary side and a secondary side, said primary side being electrically coupled to a conventional source of AC power and said secondary side providing a first AC power signal;

b. a low impedance probe having an insulated inner conductor approximately one-sixteenth inch in diameter and approximately three-fourths inch in length with first and second ends, said probe being sealedly secured through a hole in the wall of a tank into which said fluid is injected at a position in which said fluid will at least intermittently bathe said first end of said probe when said fluid is injected, said second end of said probe being disposed exterior to said tank;

c. first switching means electrically coupled to said second end of said probe and providing a second AC power signal by switching half cycles of said first AC power signal when said fluid intermittently bathes said first end of said probe, said second AC power signal being a half-wave rectified derivative of said first AC power signal;

d. means responsive to the concentration of said material in said fluid providing at its output an analog signal whose amplitude is a function of the concentration of said material in said fluid, said responsive means being energized by said first AC power signal;

e. means for generating a trigger signal when the amplitude of said analog signal exceeds a predetermined trigger level, said means for generating a trigger signal being electrically coupled to said output of said responsive means and being energized by said second AC power signal;

f. second switching means electrically coupled in series between said solenoid and said AC power, said switching means being adapted to receive said trigger signal and to respond thereto by switching said AC power across said solenoid for one full cycle of said AC power next following the appearance of said trigger signal, said second switching means being energized by said second AC power signal, whereby said second switching means causes said solenoid to be energized by said AC power source until said concentration of said material in said fluid reaches a desired level, said desired level causing said amplitude of said analog signal to fall below said predetermined trigger level.

* * * * *